United States Patent [19]
Hartmann et al.

[11] Patent Number: 4,544,441
[45] Date of Patent: Oct. 1, 1985

[54] METHOD OF MAKING A BOLOMETRIC RADIATION DETECTOR

[75] Inventors: Rolf Hartmann, Kelkheim; Albrecht Krah, Wachtersbach; Hilda Egle, Heusenstamm; Rudolf Ziegler, Remagen-Rolandseck, all of Fed. Rep. of Germany

[73] Assignee: Battelle-Institut e.V., Frankfurt am Main, Fed. Rep. of Germany

[21] Appl. No.: 512,546

[22] Filed: Jul. 11, 1983

Related U.S. Application Data

[63] Continuation-in-part of Ser. No. 184,015, Sep. 4, 1980, abandoned.

[51] Int. Cl.[4] .............. C23F 1/02; B44C 1/22; C03C 15/00; C03C 25/06
[52] U.S. Cl. ................ 156/634; 29/573; 156/652; 156/656; 156/659.1; 156/661.1; 156/901; 204/192 E; 250/338; 357/29
[58] Field of Search .......... 156/629, 633, 634, 650, 156/652, 653, 656, 659.1, 901, 902, 661.1; 250/332, 338; 29/569 L, 572, 580, 573, 846, 876–879; 204/192 EC, 192 E; 357/29

[56] References Cited

U.S. PATENT DOCUMENTS

| | | | |
|---|---|---|---|
| 3,641,353 | 2/1972 | McNally et al. | 250/213 |
| 3,767,928 | 10/1973 | Bishop et al. | 250/338 |
| 4,003,127 | 1/1977 | Jaffe et al. | 29/610 SG |
| 4,061,917 | 12/1977 | Goranson et al. | 250/338 |
| 4,070,230 | 1/1978 | Stein | 156/659.1 X |

OTHER PUBLICATIONS

"Hochempfindliches Bolometer", Elektronik, May 1979, (one page).
Khambata, Adi J., Adi. "Introduction to Integrated Semiconductor Circuits", John Wiley and Sons, Inc., (1963), pp. 24 to 26.
Tickle, Andrew C., "Thin–Film Transistors", John Wiley and Sons, Inc. (1969), pp. 74 to 75.
Broyde, Barrett, "Exposure of Photoresists II, Electron and Light Exposure of a Positive Photoresist", J. Electrochem. Soc., Solid State Science, vol. 117, No. 12, (Dec. 1970), pp. 1555 and 1556.
Magill, P. J., et al., "Photometallic Etching of Holograms", J. Electrochem. Soc., Solid State Science, vol. 118, No. 9, (Sep. 1971), pp. 1514 to 1516.
Blakemore, J. S., et al., "Shaping of Bulk Semiconductor Samples by Photolithography and Chemical Etching", J. Electrochem. Soc., Solid-State Science and Technology, vol. 128, No. 11, (Nov. 1981), pp. 2410 to 2415.

Primary Examiner—William A. Powell
Attorney, Agent, or Firm—Fisher, Christen & Sabol

[57] ABSTRACT

A bolometric radiation detector wherein the electrically-conductive measuring layer is applied to a carrier film which is supported by a frame. To produce a bolometer of this type the carrier film is produced as a layer on a base material, preferably by anodic or thermal oxidation of the base material. The measuring layer is applied to the carrier film. After providing the base material and the measuring layer with a photoresist layer, the conductors are etched out and a window is made from the reverse side. The carrier film with the measuring layer structure then remains. The parts of the base material that have not been removed serve as a frame for the carrier film.

9 Claims, 8 Drawing Figures

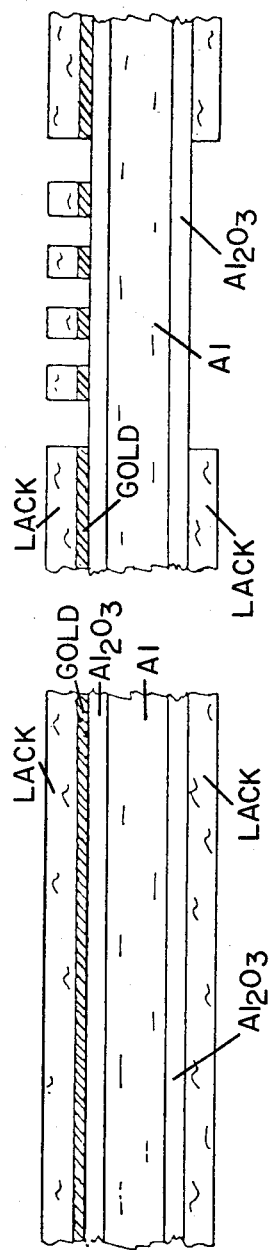
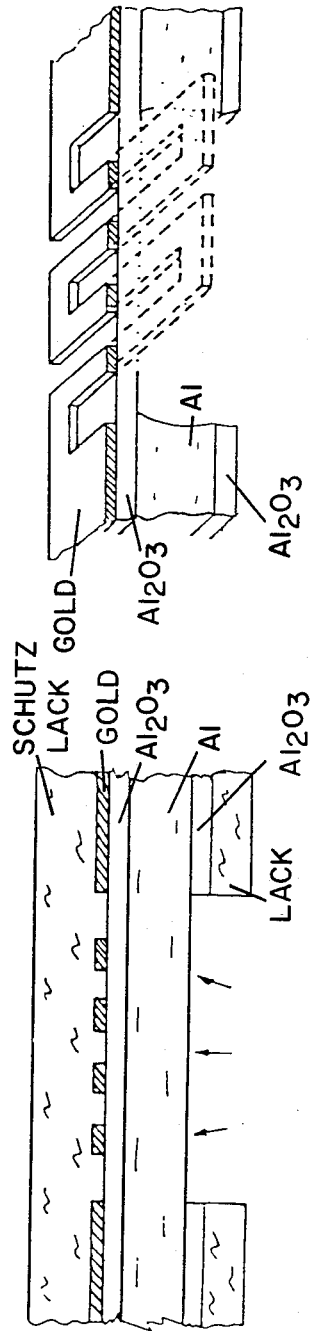
Fig. 1a  Fig. 1b  Fig. 1c  Fig. 1d

METHOD OF MAKING A BOLOMETRIC RADIATION DETECTOR

This is a continuation-in-part of application Ser. No. 184,015, filed on Sept. 4, 1980, abandoned.

BACKGROUND OF THIS INVENTION

1. Field of this Invention

This invention relates to a bolometric radiation detector, which consists essentially of a thin, temperature-sensitive, electrically-conductive measuring layer and to a method of producing the detector.

2. Prior Art

Thermal radiation detectors for the infrared range are indispensable for many applications in spite of the great advances that have been achieved in the field of cooled quantum detectors. The advantage of thermal radiation detectors is the independence of their radiation sensitivity from the wavelength and the ambient temperature.

Various types of radiation detectors are known. Those that utilize the pyroelectric effect of certain crystals can only be successfully used when on the one hand the ambient temperature is sufficiently below the Curie temperature of the crystal and on the other hand the variations in the ambient temperature do not exceed a specific value of about 0.5 K/minute.

Due to their simple and robust design, thermocouples and bolometers are preferred. The bolometer has the further advantages of constant sensitivity over the whole detector surface, the possibility of higher impedance and the reduction of the settling time by means of a rise in the working temperature.

The bolometer is normally a blackened, tape-like conductor made of a metal with a temperature-coefficient of electrical resistance that should be as high as possible. The change in resistance as a result of heating up by radiation is measured using a bridge circuit. Gold is a favorable conductor material since it is easy to work. Pure metal conductors have the significant advantage that the sensitivity of the detector (signal-to-noise ratio) is limited only by the Johnson noise of the bolometer resistance. All other parameters remaining equal, the signal-to-noise ratio is independent of the ohmic resistance of the bolometer. However, the signal level is dependent on the radiation concentration, i.e., on the square of the image scale of the light source onto the bolometer. In the manufacture of bolometers according to conventional methods, there are mechanical limits which have to be respected in the required reduction in the size of the bolometers. As a result, with even moderately small dimensions the internal resistance becomes too small, the heat capacity and thus the settling time becomes too large, and the heat dissipation via the mounting of the bolometer strip becomes much too high.

BROAD DESCRIPTION OF THIS INVENTION

An object of this invention is to create a bolometer that does not have the disadvantages of the known designs. A method of producing highly sensitive, extremely small and rapid bolometers is also an object of this invention. In particular the method according to this invention should permit a short settling time combined with high sensitivity to be achieved by reducing the thermal mass or the thermal capacity. The method of this invention should also permit the ohmic resistance to be increased by means of a suitable design of the temperature-sensitive conductor so that even in a simple version of the bolometer the known material-specific maximum sensitivity values can be exceeded.

Increasing the bolometer resistance is associated with a major advantage in that the resonant transformer for power and noise matching of the bolometer to the input amplifier can be dispensed with. When the favorable resistance is achieved, matching to low-resistance and noise-compensating preamplifiers is almost perfectly successful. This makes it possible in the case of photometric device to abandon a fixed low light alternating frequency and to utilize the full thermodynamically-limited band with of the bolometer. Devices for frequency analysis and band width limitation can then follow the amplifier chain.

Further, the production method according to this invention has to permit application-specific configurations of the bolometer surface and its size down to dimensions which correspond to the resolution capacity of optical arrangements in the medium infrared range. At the same time the production method has to be suitable for large-scale mechanization in order to rationalize the work steps in production and to keep the variation range of the bolometer data below. A further requirement is that the production process be designed in such a way as to produce a stable mounting for the bolometer or micro-bolometer, so that the mounting can be located in the optical path of the rays where it does not cause disturbance and at the same time saves space.

It has been found that these requirements can be fulfilled by a bolometric radiation detector of the type referred to earlier if the measuring layer is applied to an electrically-insulating carrier film which is supported by a frame and if the thickness of the measuring layer is less than 100 nm.

Preferably the measuring layer is formed as a meander-shaped printed conductor. Preferably the measuring layer is made of a noble metal, most preferably gold, and is between 10 and 100 nm thick, most preferably 25 nm. Also, preferably the carrier film consists of oxides of the elements berrylium, silicon and aluminum and is less than 100 nm thick. When using the radiation detector of this invention, in order to determine the position of a radiation signal, preferably several separate measuring layers are located adjacent to each other along an axis on a single carrier film so as to form a linear array. When using the radiation detector of this invention, in order to obtain an image of extended radiation signals, preferably several separate measuring layers are located on a single carrier film covering the whole surface in the x and y directions so as to form an array.

The bolometer according to this invention is fabricated by producing the carrier film on a base material, applying to the carrier film a thin conductive layer made of the material of the measuring layer, providing the base material for the carrier film and the surface of the measuring layer material with a photoresist layer, etching the printed conductor out of the conductive layer using a photolithographic method and producing a window from the reverse side in such a way that the carrier film with the measuring layer structure remains. Such is supported by the frame that is formed from the remaining substance.

Preferably, in order to etch out the printed conductors, a mask prepared using a photolithographic method is laid on the parts of the conductive layer that are to be maintained; the parts of the conductive layer that are not required are removed by a dry physical method by sputtering or sputter etching within an electric, preferably high-frequency gas discharge burning at a reduced gas pressure. The measuring layer material is preferably etched in the form of a meander-shaped printed conductor. The carrier film is preferably formed from the base material by anodic or thermal oxidation. Preferably the carrier film is applied to a different type of base material by the thin-layer technique. The measuring layer is preferably formed by evaporation in a high vacuum. Also, preferably the measuring layer is formed by sputtering. Preferably the finished bolometric radiation detector is fixed to a socket by means of conductive adhesives in an "upside-down" process and obtains its electrical contacts at the same time.

Any useful or suitable photolithographic method can be used to etch the printed conductors out of the conductive layer and to prepare the mask (or photoresists) laid on the parts of the conductive layer that are to be maintained. There are many such photolithographic methods, and such photolithographic methods are well known in the art and to one ordinarily skilled in the art. Some typical references are: Khambata, Adi J., "Introduction To Integrated Semiconductor Circuits", John Wiley and Sons, Inc., (1963) pp. 24 to 26; Tickle, Andrew C., "Thin-Film Transistors", John Wiley and Sons, Inc., (1969), pp. 74 to 75; Broyde, Barret, "Exposure Of Photoresists II. Electron and Light Exposure Of A Positive Photoresist", J. Electrochem. Soc., Solid State Science, Vol. 117, No. 12, (Dec. 1970), pp. 1555 and 1556; Magill, P. J., et al., "Photometallic Etching Of Holograms", J. Electrochem. Soc., Solid State Science, Vol. 118, No. 9, (Sept. 1971), pp. 1514 to 1516; and Blakemore, J. S., et al., "Shaping Of Bulk Semiconductor Samples By Photolithography And Chemical Etching", J. Electrochem. Soc., Solid-State Science And Technology, Vol. 128, No. 11 (Nov. 1981), pp. 2410 to 2415. In photolithographic methods, photosensitive material called photoresists (patterns or masks) are used during the production of the semiconductor devices (such as the invention bolometric radiation detector) to protect selected areas of the semiconductors and other surfaces against chemical attack. The desired pattern in the photoresist is obtained by exposing the photoresist-coated surface to light through a master mask or a pattern-controlled electron beam. After exposure to light, electrons, etc., the pattern is developed by rinsing the photoresist with a solvent. Negative resists are those that are insolubilized upon exposure, and positive resists are those that are solubilized.

In the multistage production method according to this invention the conductor material of the bolometer is applied as a thin layer to an electrically insulating carrier that is supported by a frame. The conductive layer then is divided by a photolithographic technique so as to produce a long winding printed conductor whose internal resistance can be freely adjusted within broad limits by the selection of its geometric dimensions. The carrier film is produced on the front of a substrate and then exposed by dissolving the substrate from the reverse side. The dimensions of the bolometer surface on the carrier film are between about 30 $\mu$m and a few millimeters. The thickness of the layers can be between 20 and 100 nm.

The bolometer according to this invention is particularly suitable for the infrared range.

Other objects and advantages of this invention are set out herein or are obvious herefrom to one ordinarily skilled in the art. The objects and advantages of this invention are achieved by the device and method of this invention.

SHORT DESCRIPTION OF THE DRAWINGS

In the following disclosure, further details are given on this invention using diagrams representing a single embodiment.

In the figures, which are in schematic form:

FIGS. 1(a) to 1(d) show the main steps of the preferred method of producing a special embodiment of the thin-film radiation detector according to this invention;

DETAILED DESCRIPTION OF THIS INVENTION

Figure 2:
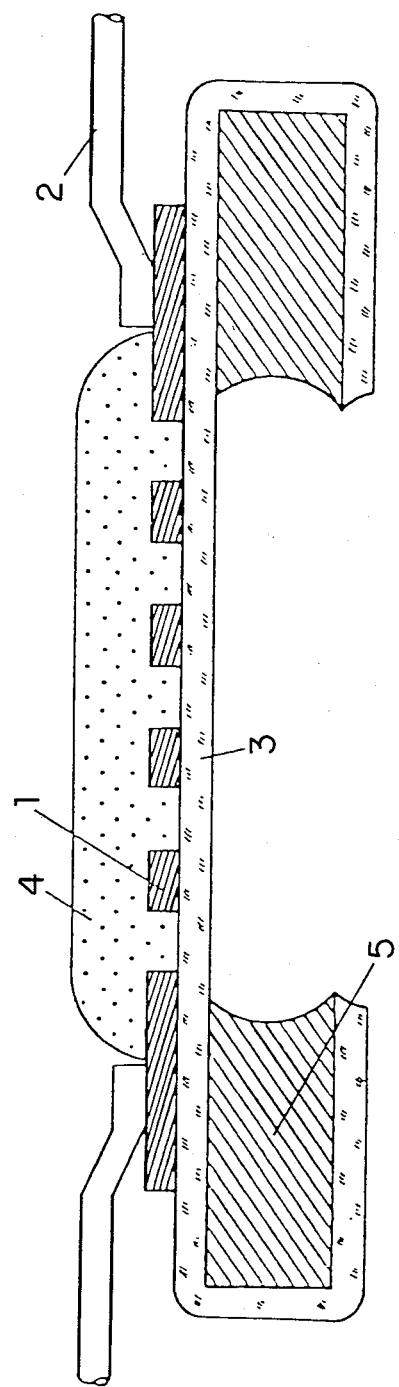
FIG. 2 is a section through the finished radiation detector produced according to the process represented in FIG. 1.

The carrier film can consist, for example, of aluminum, berrylium or silicon oxides. In this embodiment according to this invention an aluminum foil, which is not too thick, is used as a basis and serves as a substrate for the whole production process. From this the finished bolometer unit is finally separated. A ring-shaped part of it serves as a frame for the carrier film.

In stage (a) of the process shown in FIG. 1, the bright rolled aluminum foil is polished, cleaned and finally anodically oxidized preferably using diammonium hydrogen tartrate. The voltage applied during anodic oxidation is 20 V to 60 V; the process lasts approximately one hour and results in a dense oxide skin which later forms the carrier film. The surface produced on the aluminum by the anodic oxidation has the correct properties to anchor the conductor layer firmly without applying an intermediate layer of an adhesive agent such as chromium. In addition, the surface quality of the oxide layer produced in this way reduces the mobility of the conductor layer atoms to be condensed from the vapor phase, e.g., gold, so that the island effect which is damaging for a high temperature coefficient does not occur during the evaporation process. The conductor layer, e.g., gold is evaporated onto the oxide layer in a high vacuum and then tempered to achieve almost the electrical characteristic values of the compact metal.

In stage (b) the bolometer structure, e.g., meander, on the conductor layer and the window on the reverse side are etched using adjusted photomasks made from the photoresist layer that had previously been applied to both sides. At the same time a ring-shaped zone is also exposed from the reverse side of the substrate which makes it possible at a later stage to etch from the aluminum substrate the frame on which the oxide skin will be supported and to which the skin will be firmly fixed. This framework structure also serves for fitting the bolometer unit into its casing and can withstand high vibration at accelerations. The high mechanical stability thus ensured is the reason for the insensitivity of the bolometer to the microphonic effect. Using the photoresist structure produced, the meander-shaped conductor and the connection panels for the electrical contacts are etched out of the conductor layer.

The thickness of the conductor layer produced is preferably 20 to 25 nm in order to give the bolometer a resistance that is as high as possible, a low thermal inertia and at the same time little variation between individual models.

In stage (c) the freshly etched conductor is provided with a protective lacquer for the duration of the subsequent stages, after which the oxide skin still present on the reverse of the substrate at the location of the future window is removed using hydrofluoric acid.

In stage (d) the oxide film with the conductor on the front of the aluminum substrate remains after etching the window into the aluminum foil and at the same time the ring referred to earlier is etched. This is performed using concentrated hydrochloric acid to which a small quantity of copper chloride is added in order to accelerate the dissolving of the aluminum. Etching is performed from the reverse side, at the points that were exposed in stage (b) and freed of the oxide layer in stage (c). By dissolving the previously supporting aluminum substrate, the bolometer disk becomes free and can be removed as a complete unit. Finally the residual protective lacquer and photoresist coating are fully removed. The bolometer element is blackened preferably using camphor black, which keeps the thermally insert mass of the bolometer low.

FIG. 2 shows a radiation detector produced according to the method described above. It consists of meander-shaped conductor 1 with connection panels 2 which are supported by aluminum oxide film 3. Absorber 4 is fitted on top of the meander structure. At the point where the bolometer structure is to rest on oxide carrier film 3, the base material is dissolved to form a window so that carrier film 3 is left supported by remaining base material 5 which forms a frame.

Figure 3:
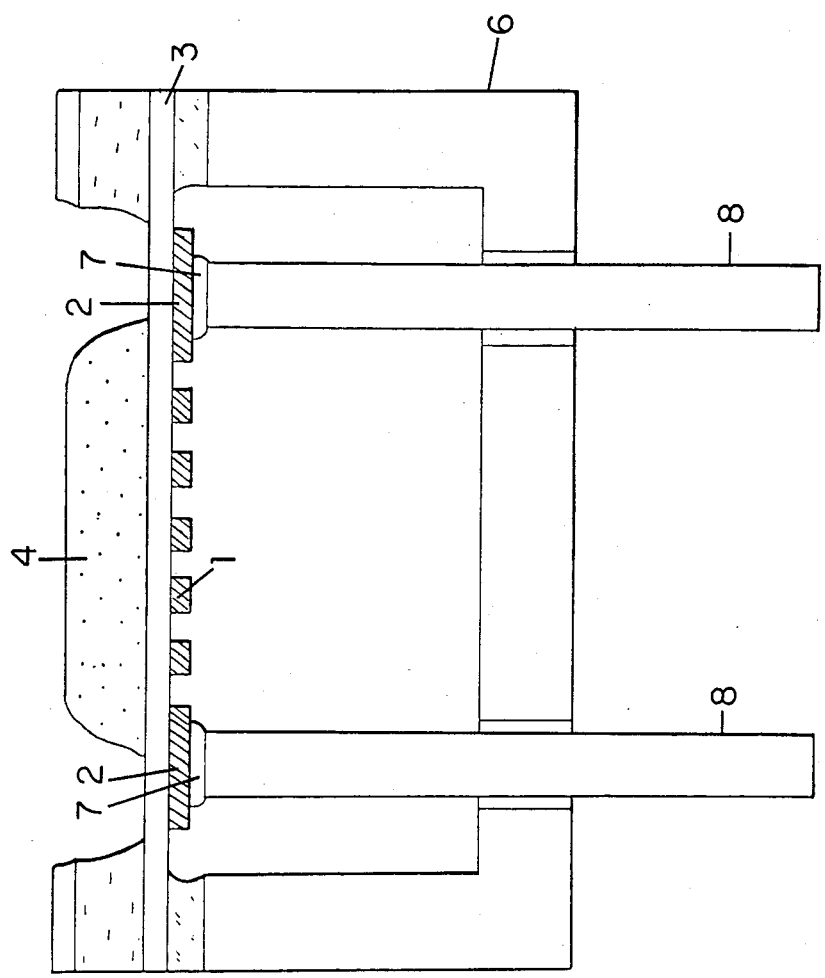
FIG. 3 is a section through the radiation detector according to this invention which is fixed to a socket by the "upside-down" process.

The finished bolometer element, i.e., the base material with the window, insulator film 3 and bolometer structure 1, can be fixed in socket 6 in a particularly simple way by the "upside-down" process, as shown in FIG. 3. Conductive adhesives are used. Since contact panels 2 come in contact with contact pins 8, the element receives its electrical contacts at the same time. In this case radiation-absorbing black layer 4 is applied to the reverse side of the bolometer element.

The size of the window and thus the size of carrier film 3 in the mounting has a major influence on the sensitivity and the response time of the bolometer. If the window is large and the bolometer is assembled in a vacuum, high sensitivity is achieved. If the window area is reduced for the same bolometer area, the heat dissipation toward the frame rises and the bolometer becomes more rapid. Thus the two usual bolometer types (radiation and heat dissipation cooled) as well as all intermediate forms can be produced according to this invention using the same method of production.

Figure 4:
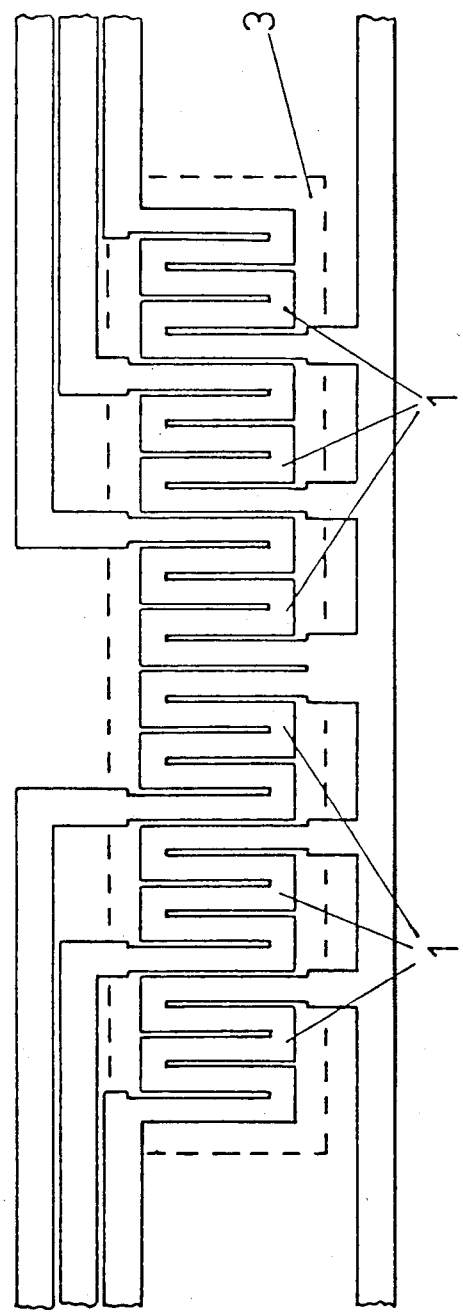
FIG. 4 is a linear array of separate measuring layers on a single carrier film.
Figure 5:
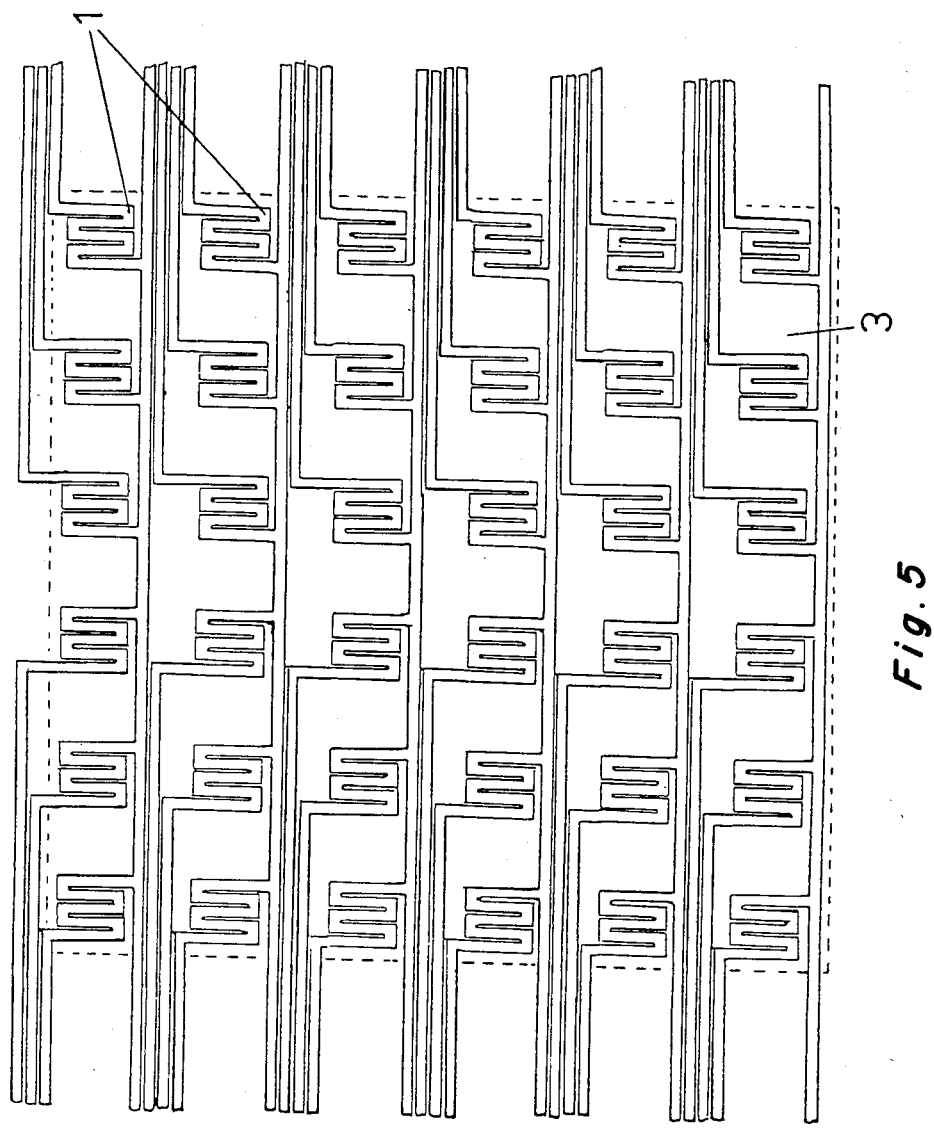
FIG. 5 is an arrangement of separate measuring layers on a single carrier film so as to cover the whole surface (array).

FIGS. 4 and 5 show that individual separate measuring layers 1 may be arranged in a linear manner or so as to cover the whole surface area of single carrier film 3 which is represented in the diagrams by a broken line. The linear array shown in FIG. 4 permits the position of a radiation signal to be detected along an axis. The plane array as shown in FIG. 5 makes it possible to obtain an image of extended radiation signals. These embodiments can be produced simply according to the method described above; the carrier film and the frame made from the base material (not shown in these diagrams) are common to all measuring layers 1. The contacts of the measuring layers can be arranged jointly or separately.

What is claimed is:

1. Method of producing a bolometric radiation detector consisting essentially of a thin, temperature-sensitive, electrically-conductive measuring layer on an electrically insulating carrier film which is supported by a frame, the thickness of the measuring layer being less than 100 nm, comprising:
   producing the carrier film on a base material;
   applying a thin conductive layer composed of the material of the measuring layer to the carrier film;
   providing the carrier film base material and the surface of the measuring layer material with a photoresist layer;
   etching the printed conductors out of the conductive layer using a photolithographic method; and
   producing a window from the reverse side in such a way that the carrier film with the measuring layer structure mreains, such being supported by a frame that is prepared from the substrate.

2. Method as claimed in claim 1 wherein, in order to etch out the printed conductors, a mask which has been prepared using a photolithographic method is laid on the parts of the conductive layer that are to be maintained and wherein the parts of the conductive layer that are not required are chemically dissolved.

3. Method as claimed in claim 1 wherein, in order to etch out the printed conductors, a mask which has been prepared using a photolithographic method is laid on the parts of the conductive layer that are to be maintained and wherein the parts of the conductive layer that are not required are removed by a dry physical method by sputtering or sputter etching within an electric, preferably high-frequency gas discharge burning at a reduced gas pressure.

4. Method as claimed in claim 1 wherein the measuring layer material is etched in the form of a meander-shaped printed conductor.

5. Method as claimed in claim 1 wherein the carrier film is formed from the base material by anodic or thermal oxidation.

6. Method as claimed in claim 1 wherein the carrier film is applied to a different type of base material by the thin-layer technique.

7. Method as claimed in claim 1 wherein the measuring layer is formed by evaporation in a high vacumm.

8. Method as claimed in claim 1 wherein the measuring layer is formed by sputtering.

9. Method as claimed in claim 1 wherein the finished bolometric radiations detector is fixed to a socket by means of conductive adhesives in an "upside-down" process and its electrical contacts are provided at the same time.

* * * * *